US007009708B1

(12) United States Patent
Ames

(10) Patent No.: US 7,009,708 B1
(45) Date of Patent: Mar. 7, 2006

(54) SYMMETRIC PERISCOPE FOR CONCENTRIC BEAM CONFIGURATION IN AN ULTRA-HIGH PRECISION LASER INTERFEROMETRIC BEAM LAUNCHER

(75) Inventor: Lawrence L. Ames, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 97 days.

(21) Appl. No.: 10/787,662

(22) Filed: Feb. 25, 2004

Related U.S. Application Data

(60) Provisional application No. 60/449,993, filed on Feb. 25, 2003.

(51) Int. Cl.
*G01B 9/02* (2006.01)
(52) U.S. Cl. ........................ 356/484; 356/450; 356/498
(58) Field of Classification Search ............... 356/4.09, 356/4.1, 450, 484, 485, 486, 496, 498, 508, 356/510, 520
See application file for complete search history.

(56) References Cited

U.S. PATENT DOCUMENTS

| 4,514,850 | A | 4/1985 | Holmes et al. |
| 5,090,803 | A | 2/1992 | Ames et al. |
| 5,291,570 | A | 3/1994 | Filgas et al. |
| 5,452,392 | A | 9/1995 | Baker et al. |
| 6,483,982 | B1 | 11/2002 | Takahashi |
| 6,582,619 | B1 * | 6/2003 | Mundt ......................... 216/83 |
| 6,646,723 | B1 | 11/2003 | Dubovitsky et al. |
| 6,710,880 | B1 | 3/2004 | Zhao |
| 2003/0234935 | A1 * | 12/2003 | Liang et al. ................. 356/450 |

FOREIGN PATENT DOCUMENTS

WO    WO 3021319 A2    3/2003

OTHER PUBLICATIONS

Ames, Lawrence, et al., "SIM external metrology beam launcher (QP) development," Lockheed Martin Advanced Technology Ctr./ Lockheed Martin Jet Propulsion Lab, SPIE Conference, Kona Hawaii, 2002 [4852-55].
Halverson, Peter G., et al., "Techniques for the Reduction of Cyclic Errors in Laser Metrology Gauges for the Space Interferometry Mission," presented at American Society for Precision Engineering ASPE's 16th Annual Meeting, Nov. 10-15, 2001.
Zhao, Feng, et al. "Development of Sub-nanometer Racetrack Laser Metrology for External Triangulation Measurement for the Space Interferometry Mission", presented at American Society for Precision Engineering ASPE's 16th Annual Meeting, Nov. 10-15, 2001.
U.S. Appl. No. 10/788,166, filed Feb. 25, 2004, Ames et al.
U.S. Appl. No. 10/349,758, filed Jan. 22, 2003, Ames et al.
U.S. Appl. No. 10/293,209, filed Nov. 12, 2002, Ames et al.
U.S. Appl. No. 10/180,086, filed Jun. 27, 2002, Ames et al.

* cited by examiner

*Primary Examiner*—Gregory J. Toatley, Jr.
*Assistant Examiner*—Denise B. Anderson
(74) *Attorney, Agent, or Firm*—McDermott Will & Emery LLP

(57) ABSTRACT

An optical component especially suited for common path heterodyne interferometry comprises a symmetric dual-periscope configuration. Each periscope is substantially identical to the other with regard to certain design aspects. The resulting design is an optical component that is highly stable with variations in temperature and angular deviations.

20 Claims, 16 Drawing Sheets

SYMMETRIC PERISCOPE FOR CONCENTRIC BEAM CONFIGURATION IN AN ULTRA-HIGH PRECISION LASER INTERFEROMETRIC BEAM LAUNCHER

CROSS-REFERENCES TO RELATED APPLICATIONS

The present invention claims priority to U.S. Provisional Application No. 60/449,993, filed Feb. 25, 2003 and is herein incorporated by reference for all purposes.

The present invention is related to the following commonly owned, co-pending applications: U.S. application Ser. No. 10/180,086, filed Jun. 27, 2002, U.S. application Ser. No. 10/349,758, filed Jan. 22, 2003), U.S. application Ser. No. 10/293,209, filed Nov. 12, 2002, and U.S. application Ser. No. 10/788,166, filed Feb. 25, 2004 concurrently filed herewith, entitled "APODIZATION OF BEAMS IN AN OPTICAL INTERFEROMETER", each of which are herein incorporated by reference for all purposes.

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms as provided for by the terms of NASA SIM Prime Contact No. NAS7-1407 awarded by the National Aeronautics and Space Administration (NASA).

BACKGROUND OF THE INVENTION

The present invention relates generally to interferometry and in particular to a highly stable optical component for use in concentric beam heterodyne interferometry.

Precision laser interferometry is used to precisely determine the distance to one or more fiducial points, such as a flat mirror, rooftop mirror, or corner-cube retro-reflector ("retro"), or between such fiducial points. An interferometer generally is composed of three components or subsystems: (1) a radiation source (e.g., a laser), (2) an optics component for producing beams of light for reference, measurement, and so on (herein referred to as a "beam launcher"), and (3) a signal processor (e.g., an observer or a photo-detector and associated electronic circuits) or other processing component to perform the interferometric determinations. In some configurations, the photo-detector is included in the beam launcher component, while much of the supporting electronics (e.g., the phase meter(s) and computer) remain with the signal processor. As can be appreciated other subsystem configurations are possible.

Interferometers can be configured to operate in a number of ways. The present invention is applicable to optical interferometers in general, operating in the regions of the electromagnetic spectrum commonly referred to as the infrared (IR) light region, visible light region, and ultra-violet (UV) light region. Since there are many configurations of optical interferometers, only a small sampling of interferometer configurations will be discussed for background purposes. It will therefore be understood that a "beam" in the context of the present invention can be IR, visible light, or UV.

Some existing beam launchers for interferometers do not produce collinear antiparallel beams. Alternatively, if the launchers do produce collinear antiparallel beams, the launchers suffer from problems including thermal drift, cross talk, beam-walk, and/or non-common-path optics, among others.

Some existing launchers that do not produce collinear antiparallel beams sometimes function by directing a single beam towards a first one of the retros. The single beam hits the first retro at a point offset from a vertex of the retro. The retro-reflected beam emerges from the first retro at a symmetrically located offset point, and the beam then is directed to a second retro. The beam and retros are positioned and aligned such the reflected beam hits the second retro also offset from the vertex, with the emerging beam doubly reflected back to an entrance point on the launcher. Such a circuitous configuration is sometimes referred to as a "racetrack" configuration. Any imperfection in the construction of a retro can affect the orientation of the individual facets of the retro, which can cause the retro-reflected beam to emerge at a deflected angle, giving a "dihedral" error that affects the measured distance. If, in addition, the retro or launcher moves in such a manner as to cause a lateral beam displacement, this displacement times the deflection angle results in an error in the measured distance (an example of a "beam-walk" error).

Precision laser interferometry can be carried out in at least two modes, namely, the "homodyne" mode or the "heterodyne" mode. Either mode can be used for the racetrack configuration.

In the homodyne mode, a beam launcher splits a laser beam of a single frequency into two beams. One beam is directed out to the retro(s) to measure the distance. Upon returning to the beam launcher, the beam is aligned and collocated (and the polarization aligned, if needed) with the other portion of the original beam, and the resulting combined beam is directed onto a photo-detector. If the extra distance traveled by the measurement beam is an integer multiple of half the laser wavelength, then, when recombined, the two beams are in phase and add constructively, resulting in an increased signal from the photo-detector. If the measurement beam is an odd multiple of a quarter of the wavelength longer, the beams add destructively, resulting in a reduced signal from the photo-detector. If the distance between the retros changes, the signal fluctuates, and the fluctuations in the signal give a measure of the relative motion of the retros. A signal processor (e.g., an observer or a photo-detector and electronic circuit) "counts fringes" to determine the change in distance between the retros relative to an initial distance. The resolution of a homodyne interferometer is limited, as it is difficult to measure changes in distance significantly smaller than the laser wavelength (typically a half to several micrometers) due to intensity fluctuations of the laser.

A heterodyne interferometer configuration uses two beams that are offset in frequency to slightly different frequencies. Typically, the beams originate from a single laser. The difference between the frequencies is chosen to be convenient for detectors and electronics. Typically, the frequency difference is in the range of about 10 kHz to about 100 MHz. Typically, one frequency-offset laser beam (the "measurement beam") emanates from the beam launcher to interrogate the distance to the retro(s) while the second frequency-offset laser beam (the "local oscillator" or LO) beam remains internal to the beam launcher. When the measurement beam and the LO beam are aligned, collocated, and with aligned polarizations, and are directed onto the photo-detector, the photo-detector produces a "beat" signal. By comparing this beat signal to the known difference of frequency offsets between the laser beams, it is possible to track changes in the relative phase of the signal to find the change in retro distance relative to the initial value. With precision phase meters, it is possible to resolve distances to small fractions of the laser wavelength, resulting in measurements with sub-nanometer precision.

When measuring distances with fine precision, various error sources can affect the results. The laser intensity can fluctuate. The laser radiation is often routed to the beam launcher by means of optical fibers, where small effects such as a temperature variation or a strain on the fiber can affect the apparent optical length of the fiber and can result in a phase change that erroneously appears to be a measured displacement of the fiducial points. These errors can be reduced by replacing the "known difference" of the laser frequency offsets with a "reference signal" that measures the frequency difference directly. This reference signal is created by mixing a portion of the LO beam with the "reference beam", which is a portion of the first laser beam that does not interrogate the distance between retros, and directing the combined beam onto a second photo-detector. The use of a reference beam significantly reduces the errors introduced by any common element (e.g., laser or fiber), but it cannot correct for elements that are unique to the measurement path or the reference path. Other errors can be reduced by sharing elements between the measurement and LO beams. The measurements are not affected by elements in the beam-path "downstream" from the point where the two laser beams are first combined (the point where they become aligned, like-polarized, and collocated), as the elements are common to both beams.

High precision interferometry requires improvements in the areas of thermal drift and angular deviations of the beam. It is difficult to create an operating environment that eliminates or otherwise reduces thermal drift in the interferometric equipment to acceptable levels. Therefore, it is desirable to decrease the sensitivity of one or more components of an interferometer to variations in ambient temperature. Similarly, beam alignment can not be absolutely maintained. Therefore, it is desirable to provide a design that can compensate for angular deviations when they occur.

BRIEF SUMMARY OF THE INVENTION

An optical component for use in an interferometer comprises a symmetric periscope arrangement. Two periscopes, each having certain substantially identical design parameters are aligned for common path interferometry, which includes collocated beam and spatially separated beam configurations. A source beam is received, from which a measurement beam and a reference beam are produced. The reference beam is reassembled with a returning measurement beam that has interrogated a target. The symmetric periscope arrangement cancels common distortions along the reference beam path and the returning measurement beam path so that the beams are always properly reassembled, despite distorting optical effects as might arise due to temperature fluctuations, minor angular deviations, and so on.

BRIEF DESCRIPTION OF THE DRAWINGS

The present invention is described in further detail by way of illustrative embodiments as shown in the following figures, wherein.

DETAILED DESCRIPTION OF THE INVENTION

Figure 1:
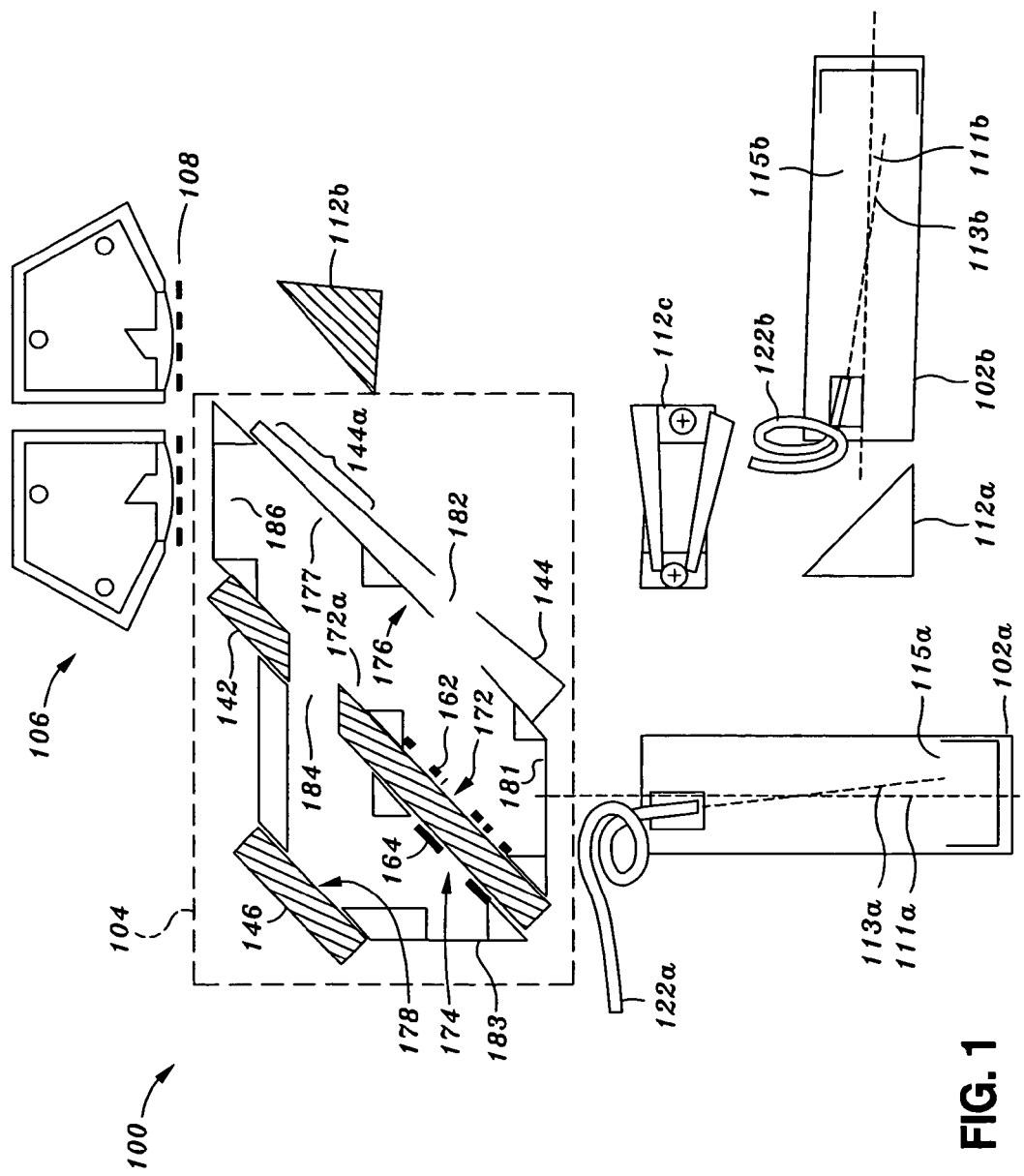
FIG. 1 is a simplified schematic showing an illustrative embodiment of an interferometer that incorporates aspects of the present invention.

FIG. 1 shows an embodiment of the present invention as incorporated in an illustrative example of an interferometer. The figure shows the basic components of an optical interferometer that operates in a common path heterodyne mode. The embodiment shown performs measurements in a "racetrack" (RT) configuration to monitor changes in separation distance between fiducial points. A collimator 102a provides a first source beam. In the specific embodiment shown, the collimator 102a is an off-axis parabolic collimator. The particular collimator shown is described in more detail in U.S. application Ser. No. 10/349,758. Briefly, a fiber optic 122a provides a beam of light along light path 113a. The beam reflects off a parabolic mirror 115a and travels along light path 111a. It can be appreciated of course that other suitable light sources (including UV, visible, and IR light) can be used. It is noted that light sources that do not produce collimated beams can also be used.

For heterodyne mode operation, a second collimator 102b is provided. In the specific embodiment shown, the second collimator is also an off-axis parabolic collimator, though any other suitable light source can be used. A fiber optic 122b is arranged to direct a beam along axis 113b to parabolic mirror 115b. The reflected and collimated light travels along axis 111b. The resulting beam is referred to as a local oscillator (LO) beam.

The optical component 104, also referred to as a beam launcher, receives and directs the source beams produced by the collimators 102a and 102b. The beam launcher 104 comprises various optic surfaces and openings to define optical paths within the component. The openings are identified by the reference numerals 181–186. The surfaces of the beam launcher 104 include reflective surfaces 172, 174 of a double-sided mirror 142. A channel formed through the double-sided mirror 142 terminates at one end with an opening 184. A reflective surface 172a having an opening through it is aligned with the opening 184. A mirror 144 is provided with an opening 182. A reflective surface 176 of the mirror 144 is provided with an opening that is aligned with the opening 182. The mirror 144 may include a beam combining element 144a that includes a reflecting surface 177 that is partially reflective and partially transmissive (beam splitter). The beam launcher 104 further comprises a fold mirror 146 having a reflective surface 178. In the embodiment described herein, the reflective surfaces comprise layers of Au (gold) deposited by known thin film deposition methods. It can be appreciated that the reflective surfaces can be produced with other materials and using other fabrication techniques. Disposed on the reflective surface 172 is a first apodization mask 162. A second apodization mask 164 is disposed relative to the reflective surface 174. It is noted that the apodization masks are not necessary to practice the present invention. As will be discussed below, the apodization masks are provided to enhance the performance of the interferometer.

To complete the discussion of FIG. 1, additional optics include fold mirrors 112a and 112b to direct the LO beam produced by the collimator 102b to the beam combining element 144a. A pair of shallow wedge prisms form a "Risley pair" (Risley prism) 112c for increased precision alignment of the LO beam with respect to the beam combining element. The opening 186 of the beam launcher 104 is aligned with the other photodetector. The photodetector 106 comprises known processing electronics such as detectors, pre-amps, phase meters, and so on to perform interferometric measurements. The photodetector shown is a dual unit detector for redundancy. A single unit detector can be used. A mask 108 is provided at the entrances to each of the photodetectors of the dual detector units 106. The mask is to help reduce signal cross-talk, a cause of cyclic error. Additional detail of the mask 108 is provided in U.S. application Ser. No. 10/293,209, filed Nov. 12, 2002.

Figure 2:
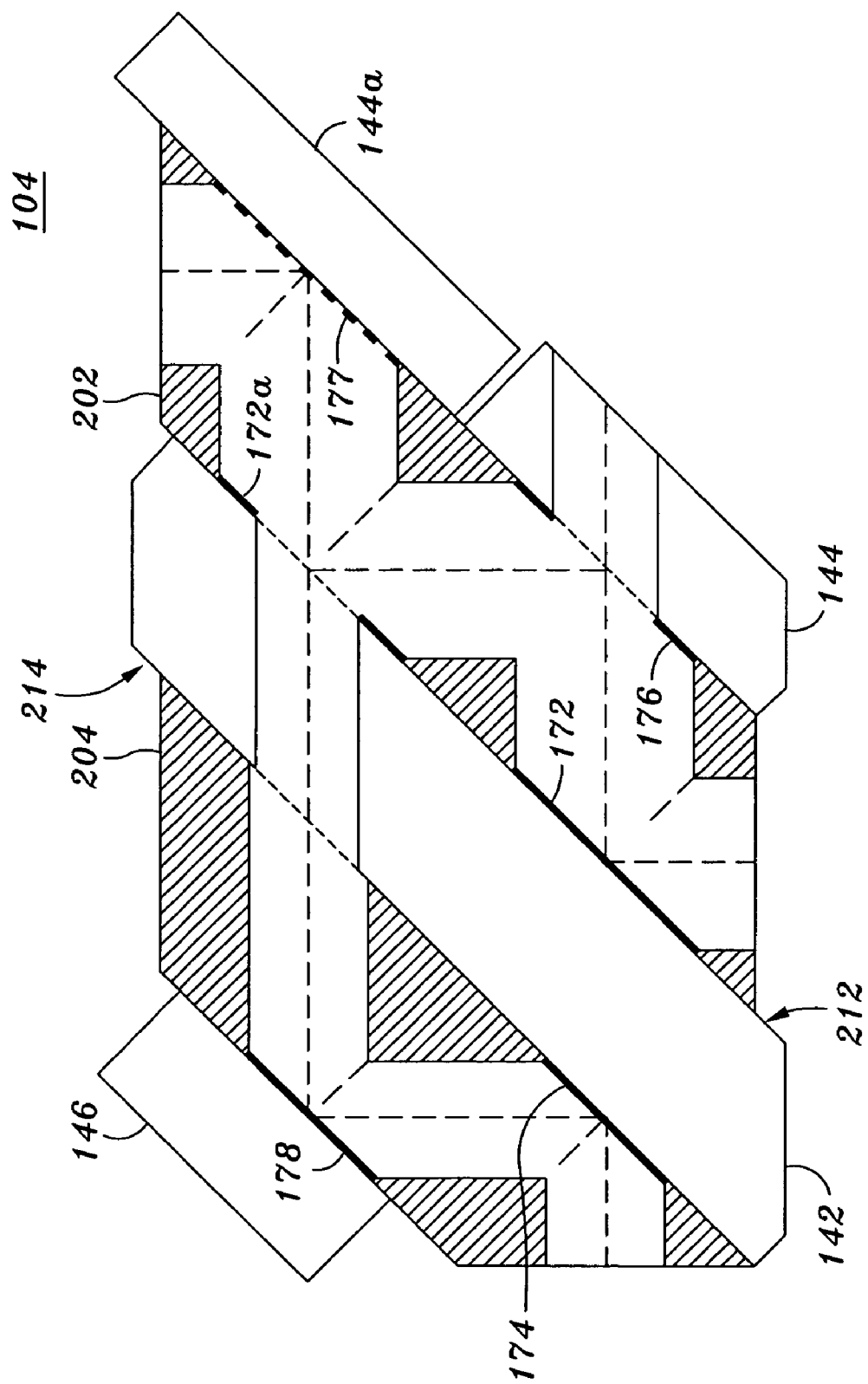
FIG. 2 is an enlarged view of the optical element shown in FIG. 1, highlighting the reflective and semi-reflective surfaces.

FIG. 2 shows an enlarged view of the optical component 104. The optical element can be viewed as a pair of "symmetric periscopes." A first "periscope" is defined by the reflective surfaces 172a and 176. A second "periscope" is defined by the reflective surfaces 174 and 178. In accordance with an aspect of the present invention, opposed reflective surfaces of the first periscope are arranged in substantially parallel relation. Reflective surface 172a is formed on a first surface of the double-sided mirror 142. Reflective surface 172a is in opposed relation to and in parallel relation to reflective surface 176. Likewise, opposed reflective surfaces of the second "periscope" are in parallel relation, namely, reflective surface 174 is in opposed relation to and in parallel relation to reflective surface 178. In a particular embodiment of the optical component 104, the reflective surface 172a is parallel to the reflective surface 176 to within to 10 $\mu$R (micro-radians), or 2 arcsec. Similarly, the reflective surface 174 is parallel to the reflective surface 176 to within to 10 $\mu$R, or 2 arcsec.

The embodiment of the optical component 104 shown in FIG. 2 includes spacers 202 and 204. The spacer 202 serves to provide mechanical support to maintain the parallel relation between the reflective surface 172a formed on one side of the double-sided mirror 142 and the reflective surface 176 formed on the mirror 144. Likewise, the spacer 204 serves to provide mechanical support to maintain the parallel relation between the reflective surface 174 formed on the other side of the double-sided mirror 142 and the reflective surface 178 formed on the fold mirror 146. A suitable material used for the spacers is a ceramic called ZERO-DUR®, a transparent glass ceramic known for its extremely low coefficient of thermal expansion, 0±0.10×10−6/° K from 0 to 50° C. For high precision interferometry, ZERODUR® is a preferred material. However, other spacer materials can be used depending on the design parameters of the interferometer.

Figure 2A:
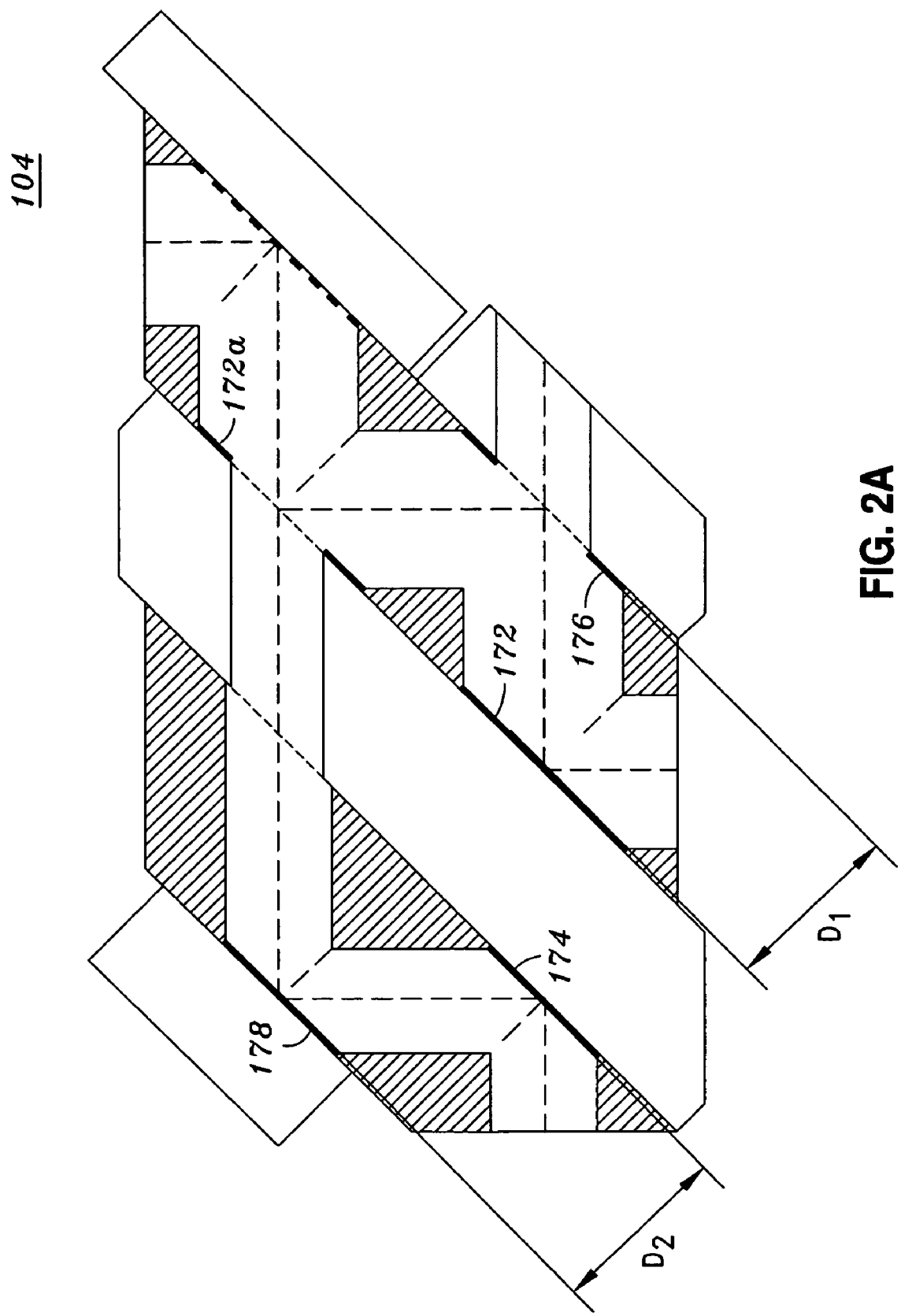
FIG. 2A illustrates the separation distances among the reflective surfaces shown in FIG. 2.

In accordance with another aspect of the present invention, the spacing between the spaced apart reflective surfaces of the first "periscope" is substantially equal to the spacing of the spaced apart reflective surfaces of the second "periscope." The spacers 202 and 204, therefore, also serve to establish and maintain equal spacing between the reflective surfaces of each "periscope." Therefore, referring to FIG. 2A, the spacer 202 establishes the separation distance between reflective surfaces 172a and 176 is $D_1$. It is noted that "separation distance" refers to the length of the perpendicular between the plane containing reflective surface 172a and the plane containing the reflective surface 176. Similarly, for the second "periscope" the spacer 204 establishes the separation distance between reflective surfaces 174 and 178 is $D_2$, where $D_1$ is substantially equal to $D_2$. In a particular embodiment of the optical component 104, the distance $D_1$ (and $D_2$), is in the range of 10–20 mm±25 $\mu$m. It is worth noting that the magnitude of the separation distance is not important, only that $D_1$ and $D_2$ are substantially equal.

In accordance with still another aspect of the present invention, is that the first "periscope" is substantially in parallel relation to the second "periscope." The particular embodiment of the optical component 104 shown in FIGS. 2 and 2A achieves this arrangement via the use of the double-sided mirror 142. The two major surfaces 212 and 214 of the double-sided can be machined to be parallel to within any desirable margin of error. In this way, the two "periscopes" are constrained to be in parallel relation to each other. In a particular embodiment of the optical component 104, the two "periscopes" are parallel to within 150 $\mu$R, or 30 arcsec.

It can be appreciated that the two "periscopes" can be physically separate components, rather than sharing a common component such as the double-sided mirror. Of course, a configuration which uses separate "periscopes" may be more difficult to align to attain a desired parallel relation. Nonetheless, such a configuration might be appropriate for a given design, and falls within the scope of the present invention.

Figure 2B:
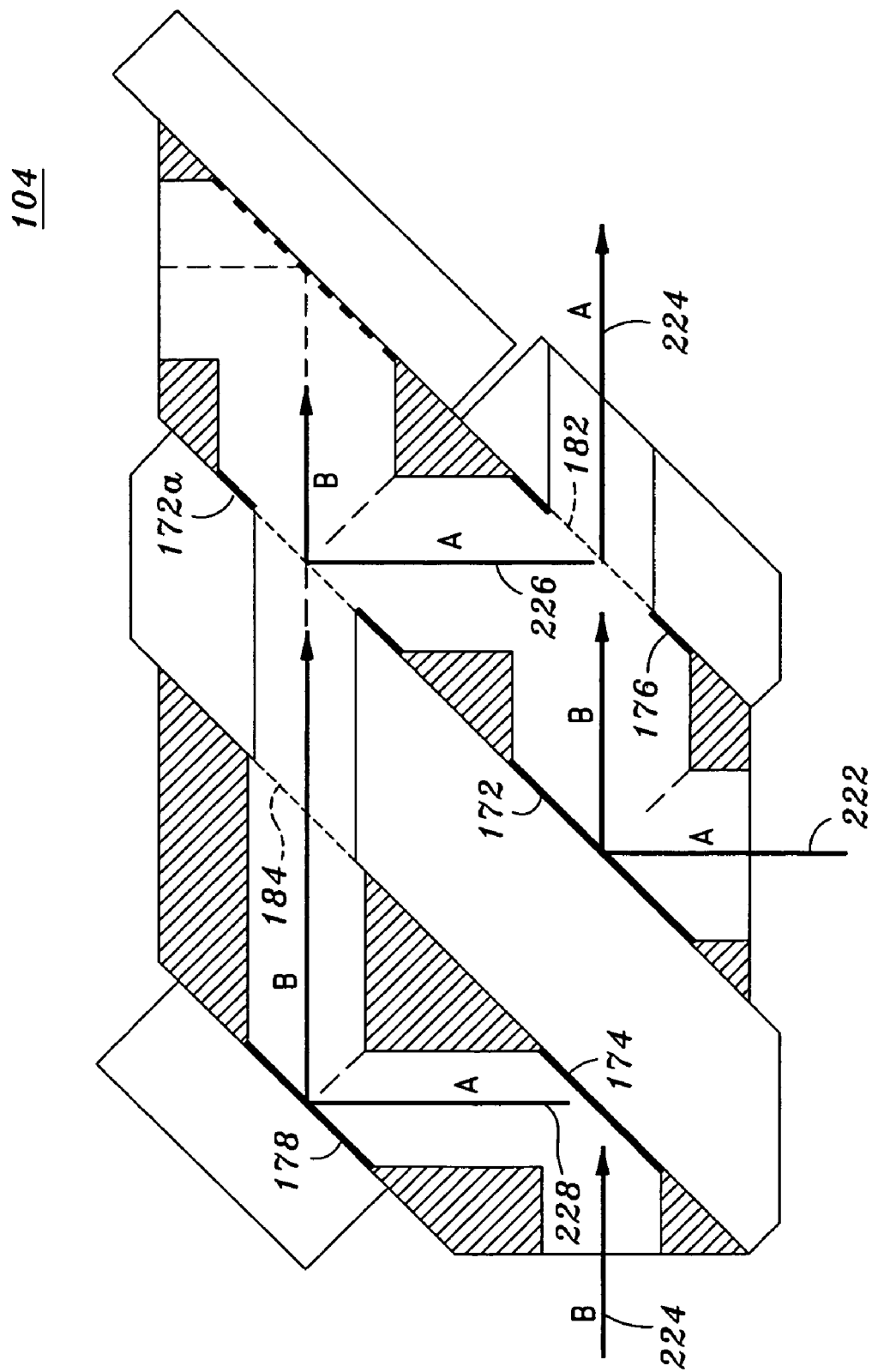
FIG. 2B illustrates the beam paths within the optical component.
Figure 2C:
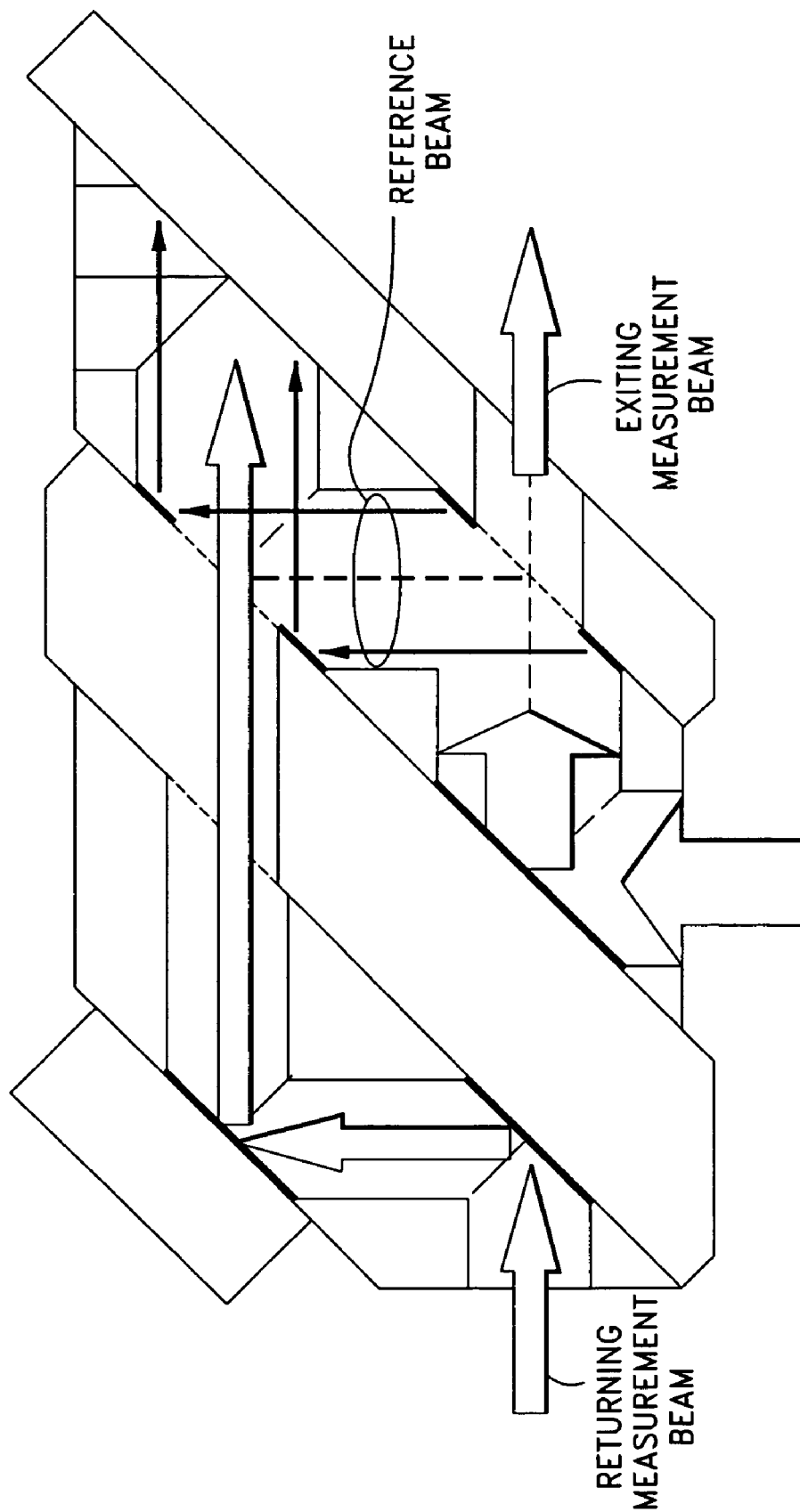
FIG. 2C illustrates the various beams that propagate along the beam paths shown in FIG. 2B.

FIG. 2B shows the various beam paths taken by the various beams (identified in FIG. 2C) produced by the optical component 104. A source beam enters the optical component along a beam path 222, comprising incident segment A and reflected segment B. A portion of the beam that propagates along segment B passes through the opening 182 and exits the optical component as a measurement beam propagating along a segment A of a beam path 224. Another portion of the beam along segment B of the beam path 222 is reflected by the reflective surface 176 as a reference beam along beam path 226. The reflective surface 172a has an opening that corresponds to the opening of the reflective surface 176, and is aligned with the reflective surface 176 so that the reference beam propagating along segment A of the beam path 226 is incident to the reflective surface 172a. The reference beam reflects off of the reflective surface 172a and then propagates along segment B of the beam path 226.

As for the measurement beam that is propagating along segment A of the beam path 224, it is directed to a target (not shown). The target, for example, can be a pair of fiducial points, where a cornercube retro-reflector is provided at each fiducial point and arranged in a racetrack or other circuitous configuration. The measurement beam is reflected by the target and returns to the optical component 104 along segment B of the beam path 224. The reflective surface 174 reflects the returning measurement beam along a segment A of a beam path 228 toward the reflective surface 178 which directs the returning measurement beam along segment B of the beam path 228. The reflective surface 178 is aligned such that segment B of the beam path 228 passes through the opening 184. Moreover, segment B of the beam path 228 lies along segment B of the beam path 226. Consequently, the returning measurement beam that is propagating along segment B of the beam path 228 is reassembled ("reconstructed") with the reference beam that is propagating along segment B of the beam path 226.

A further note worth mentioning is that the reflective surface 172 does not constitute part of the "symmetric" periscope arrangement. The beam that is reflected by this surface has not yet been separated into the reference beam and the measurement beam. Consequently, the reflective surface 172 can be positioned anywhere that is suitable, for a particular design, to direct the source beam toward the reflective surface 176.

Figure 3B:
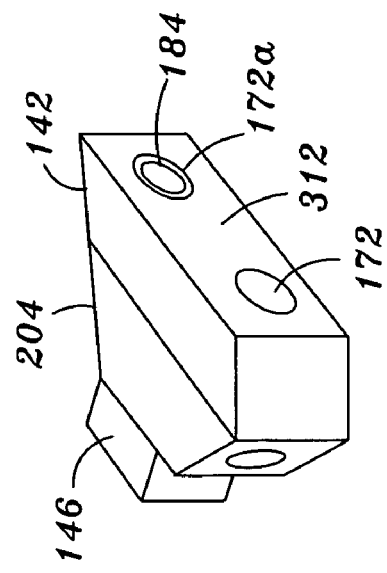
FIGS. 3A–3D show an assembly sequence a particular embodiment of the optical component of the present invention.
Figure 3D:
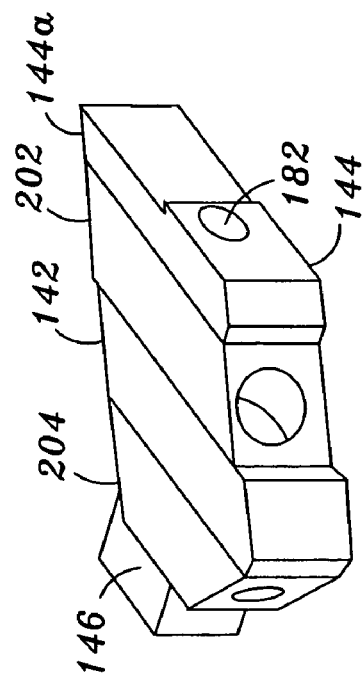
Figure 3A:
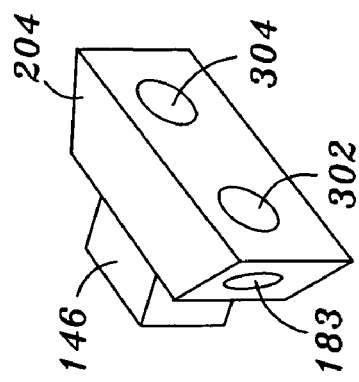

FIGS. 3A–3D show an assembly sequence illustrating the elements which comprise the optical component 104. FIG. 3E is an isometric cutaway view of the optical component 104. FIG. 3A shows the fold mirror 146 and the spacer 204. A right angle channel 302 (shown more clearly in FIG. 3E) is formed through the spacer 204, one end of which is the opening 183 shown in FIG. 1. As can be seen in FIG. 1, the right angle channel 302 opens to the reflective surface 178. Another channel 304 is formed through the spacer 204. One end of the channel 304 opens to the reflective surface 178 (occluded in this figure by the spacer 204) of the fold mirror 146. As will be seen, the other end of the channel 304 faces the opening 184.

FIG. 3B shows the placement of the double-sided mirror 142. One major surface of the double-sided mirror 142 is coated with a reflective coating such as gold to produce the reflective surface 174, which is occluded in this figure. As can be seen in FIGS. 1 and 3E, the reflective surface 174 is formed in alignment with an opening in the channel 302 formed through the spacer 204. Reflective surfaces 172 and 172a are formed on major surface 312 of the double-sided mirror 142. A channel 306 is formed through the double-sided mirror 142 with the opening 184 shown in FIG. 1 and with an opening that is formed through the reflective surface 172a.

Figure 3C:
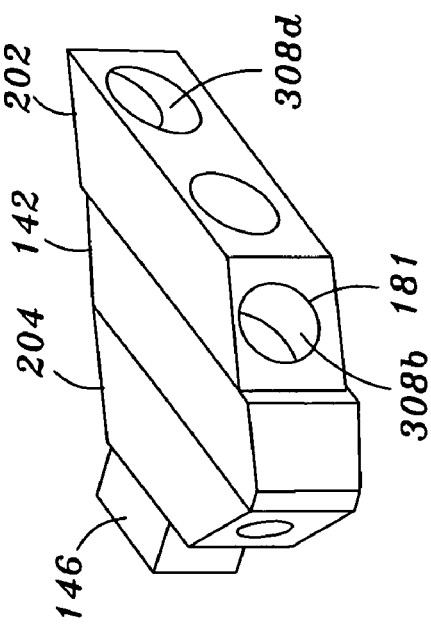
Figure 3E:
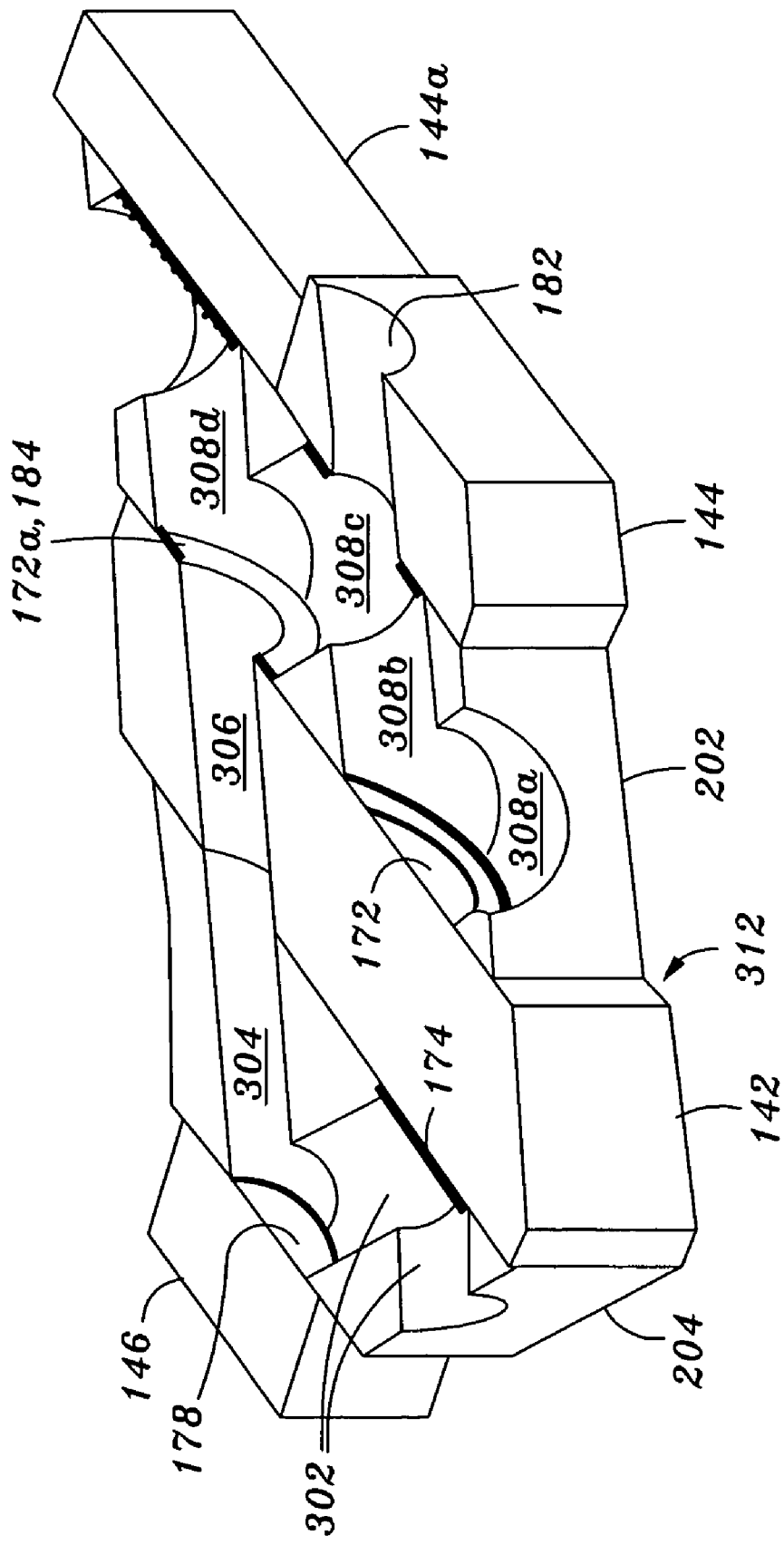
FIG. 3E is an isometric cutaway view of the optical component.

FIGS. 3C and 3E show the placement of the spacer 202. Numerous channels are formed through the spacer, as shown in FIG. 3E. An opening of one channel 308a constitutes the opening 181. Another opening of another channel 308b in the spacer 202 aligns with the opening 182. Yet another channel 308d has an opening in alignment with the reflective surface 172a.

FIG. 3D shows a completed assembly. The reflective surface 176 of the mirror 144 is aligned with the opening 182 of a channel formed through the spacer 202. A channel formed through the reflective surface 176 provides an opening through which the measurement beam (FIG. 2C) can exit. The beam combining element 144a is in alignment with the opening of the channel 308 formed in the spacer 202. It can be appreciated that other spacer designs can be used. In fact, the reflective surfaces can be formed on free-standing substrates. Such and embodiment is discussed below.

In one embodiment, the mirror 144 and the beam combining element 144a are fabricated on a single substrate. Alternatively, the beam combining element 144a can be fabricated as a component separate from the mirror 144. This allows for placement of the beam combining element 144a elsewhere in the system. The present invention does not impose any requirement with respect to the positioning of the beam combining element.

Figure 4A:
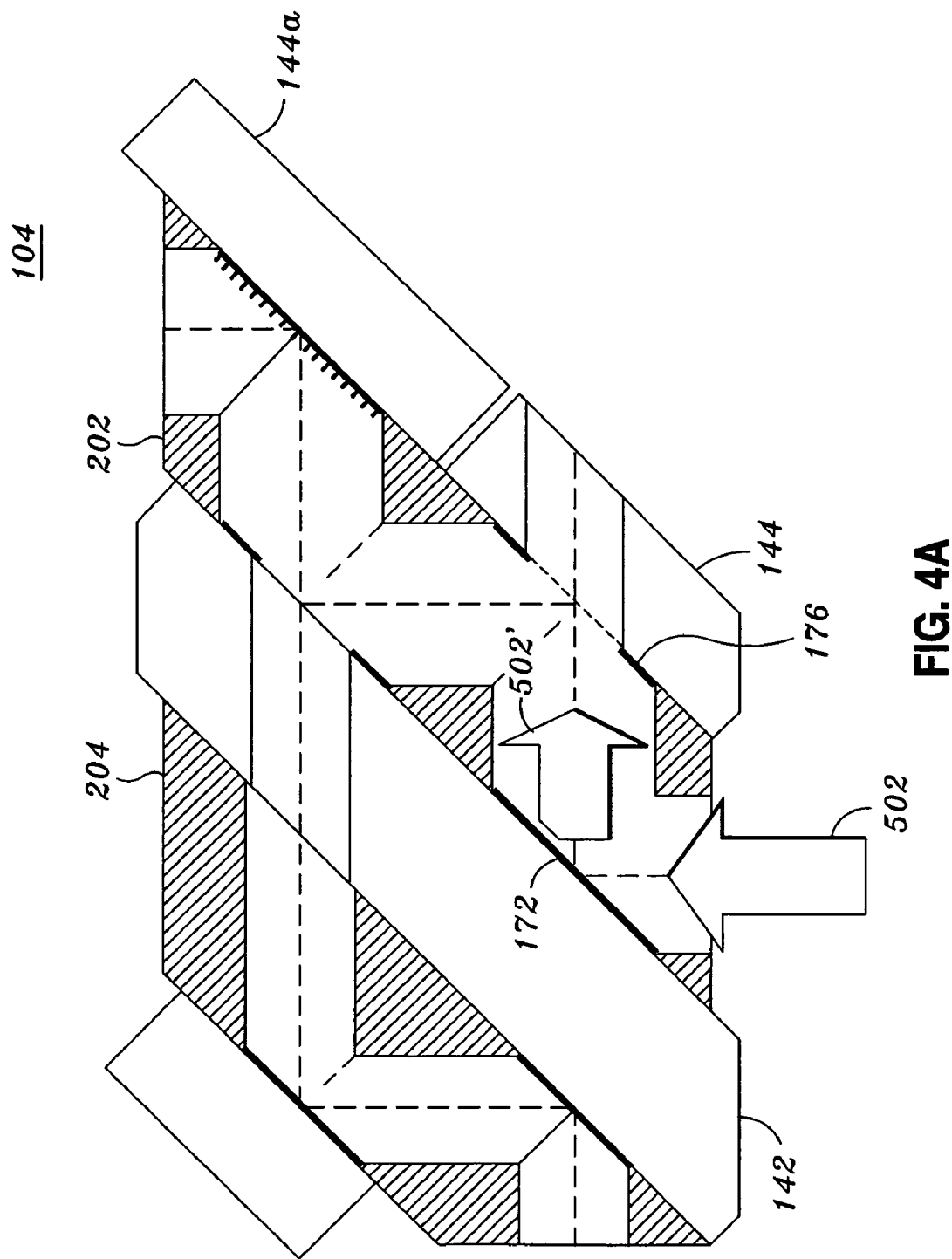
FIGS. 4A–4D show the generation of the various beams in the optical component.
Figure 4B:
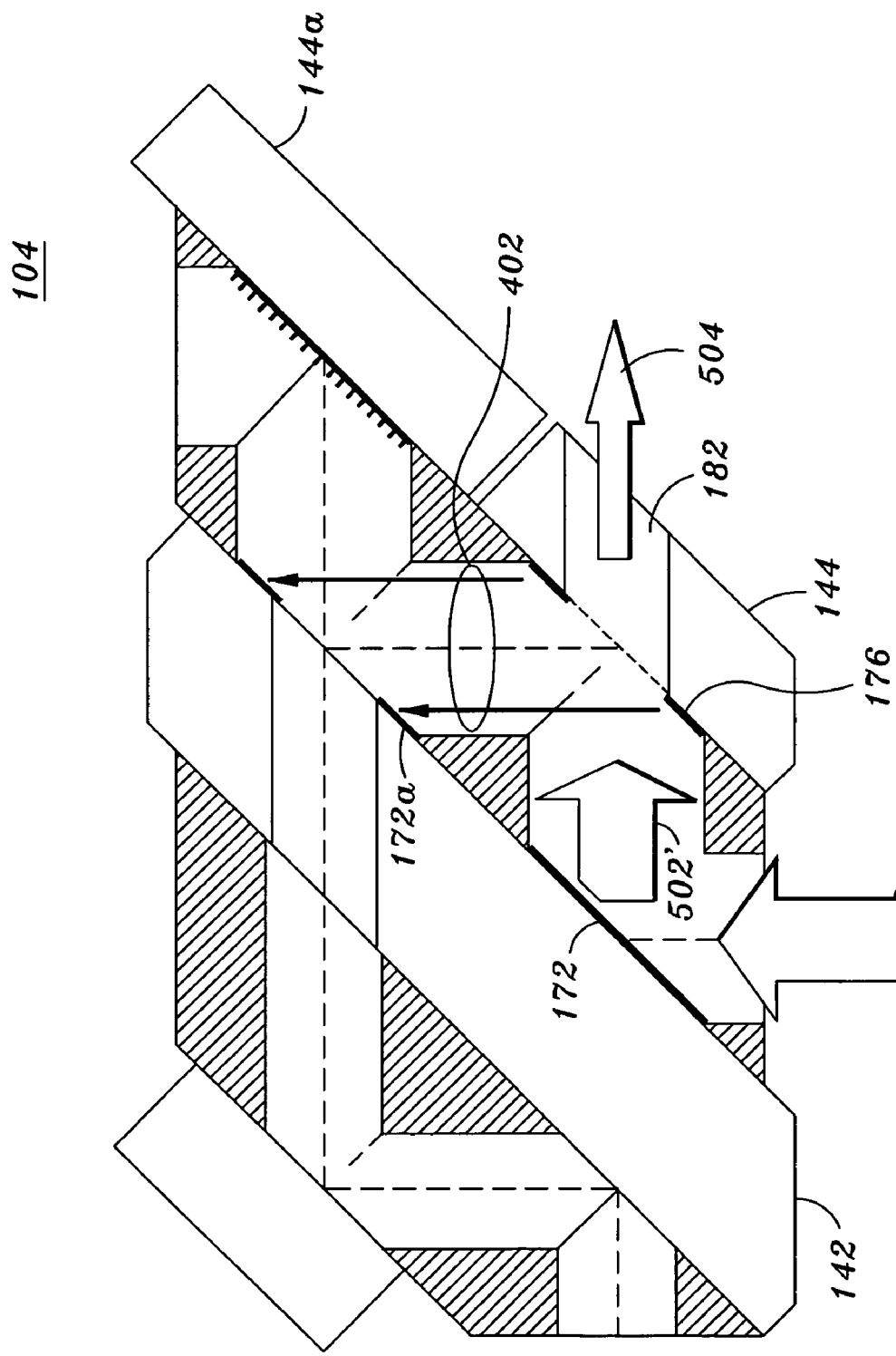

FIGS. 4A–4D show a beam propagation sequence in the optical component 104 during operation of the interferometer. FIG. 5 is an isometric view of a solid-model rendering of the interferometer shown in FIG. 1, illustrating the beam paths of the interferometer. In FIG. 4A, a source beam 502 is directed to the reflective surface 172, where it is reflected toward the reflective surface 176 of the mirror 144 as a reflected beam 502'. FIG. 4B shows a portion of the reflected beam 502' (more specifically, a core portion) passes through the opening 182 as a measurement beam 504 that is directed toward a target. As indicated in FIG. 5, the target comprises a pair of cornercube retro-reflectors CC1, CC2 as the fiducial points of the interferometer.

FIG. 4B further shows that another portion of the reflected beam 502' is reflected off of the reflective surface 176. Due to the opening formed through the reflective surface 176, the reflected portion of the beam 502' has an annular shape. This beam is referred to as the reference beam 402. The reference beam 402 is directed toward the reflective surface 172a.

Figure 4C:
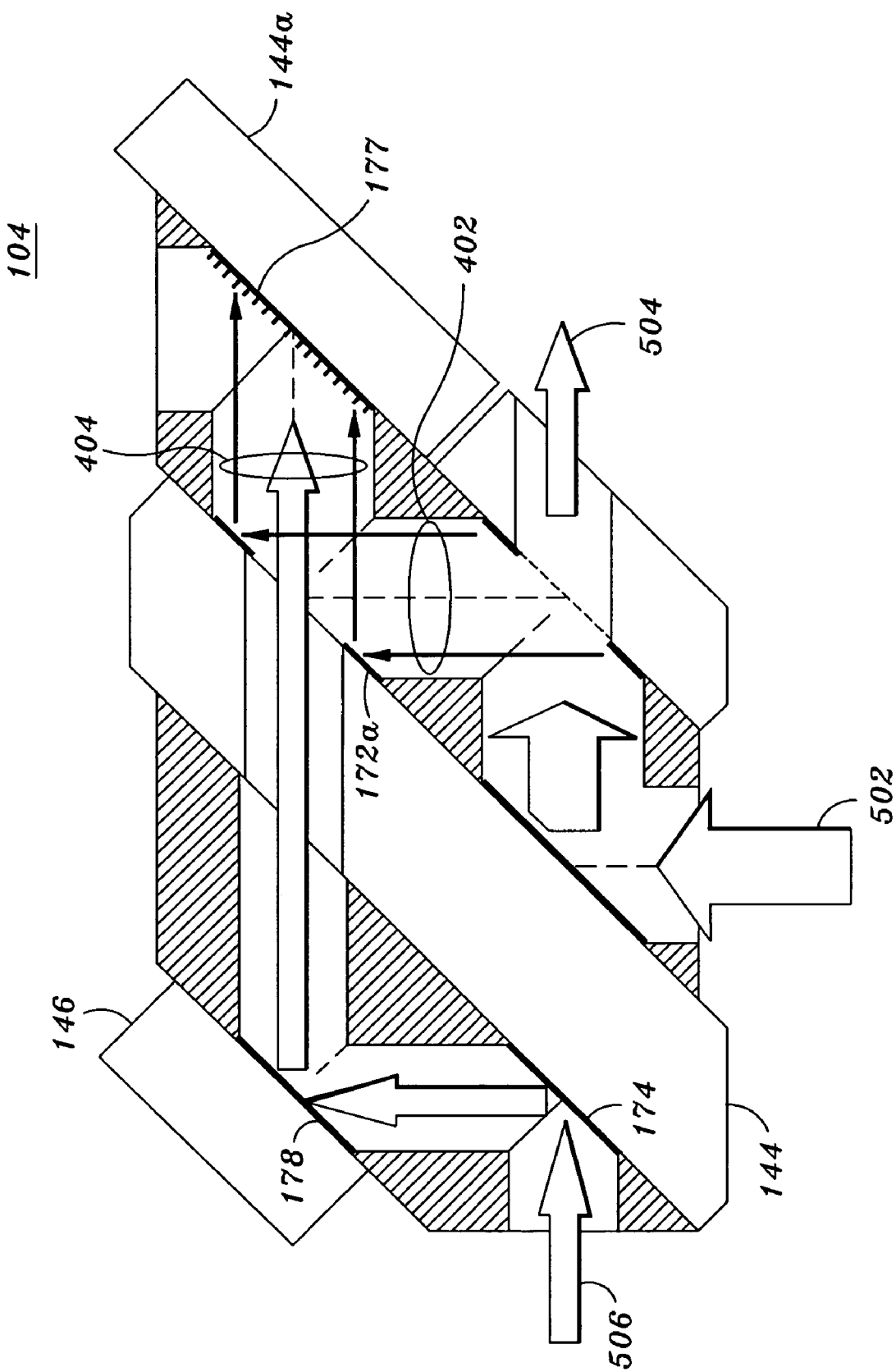
Figure 5:
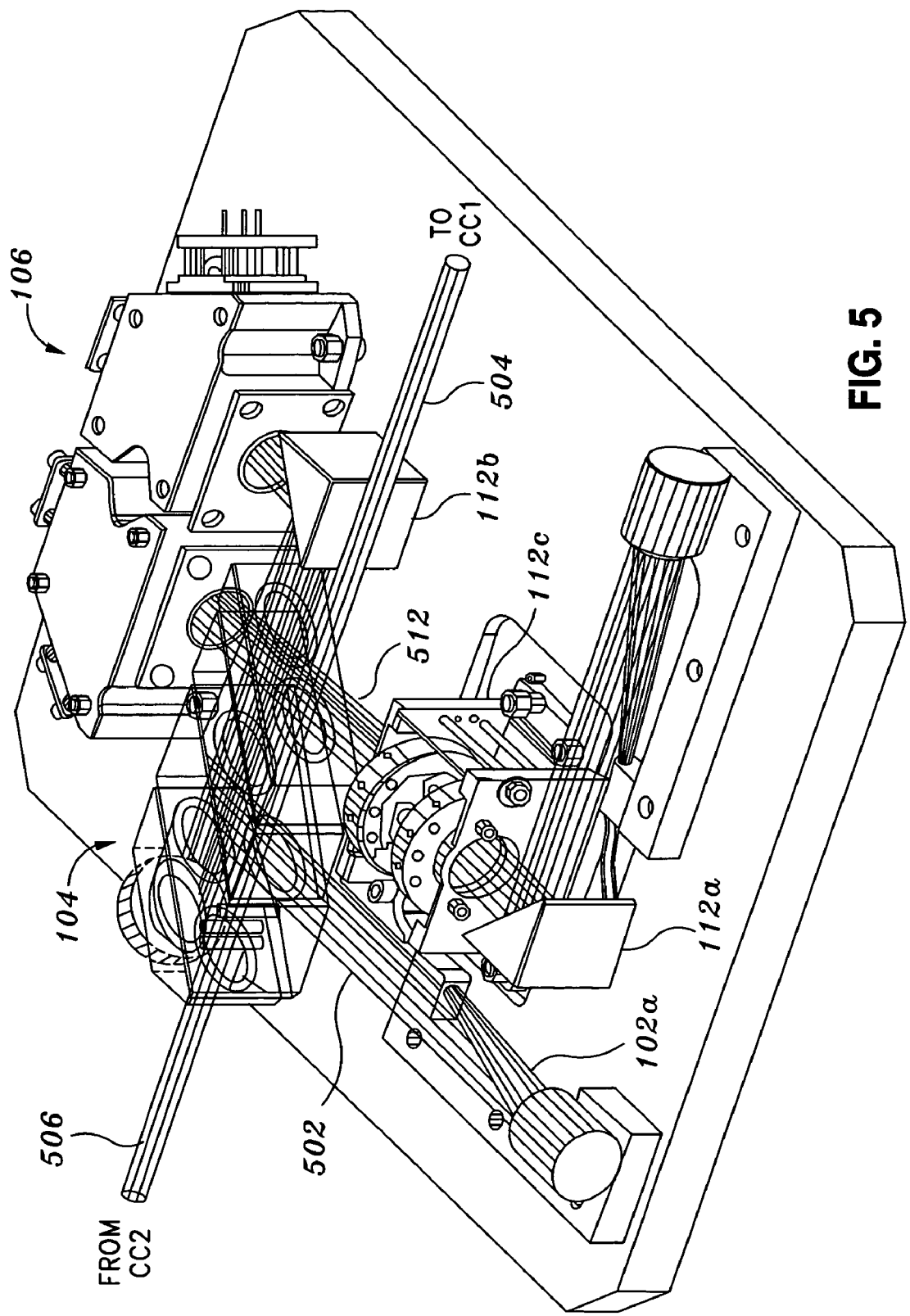
FIG. 5 is an isometric view of the device of FIG. 1, showing beam propagation.

FIGS. 4C and 5 indicate that the measurement beam 504 is reflected back by the target. More specifically, in the particular embodiment shown, the measurement beam is reflected by CC1 to CC2, and from CC2 back to the optical component 104 as a returning measurement beam 506. The reflective surface 174 is aligned such that the returning measurement beam is incident on the reflective surface 174 and reflects the beam toward the reflective surface 178. The beam is then reflected along segment B of the beam path 228 (FIG. 2B). Meanwhile, the reference beam 402 is directed by the reflective surface 172a along segment B of the beam path 226 (FIG. 2B). As discussed in connection with FIG. 2B, segment B of the beam path 226 coincides with segment B of the beam path 228, and so the reference beam 402 and the reflected returning measurement beam are combined along segment B of the beam path 226 to produce a reconstructed (reassembled) beam 404. The beam 404 is "reconstructed" in the sense that the reference beam 402 and the exiting measurement beam 504 were originally produced from the source beam 502, and so the beam 404 is can be loosely viewed as a reconstruction of the source beam 502.

The distance traversed by the measurement beam 504 between the fiducial points may vary as the distance between the fiducial points vary. This will manifest itself in changes in the phase difference between the reference beam 404 and the reflected returning measurement beam when they are reassembled as beam 404. These variations in the phase difference are the basis for the interferometric measurements.

Figure 4D:
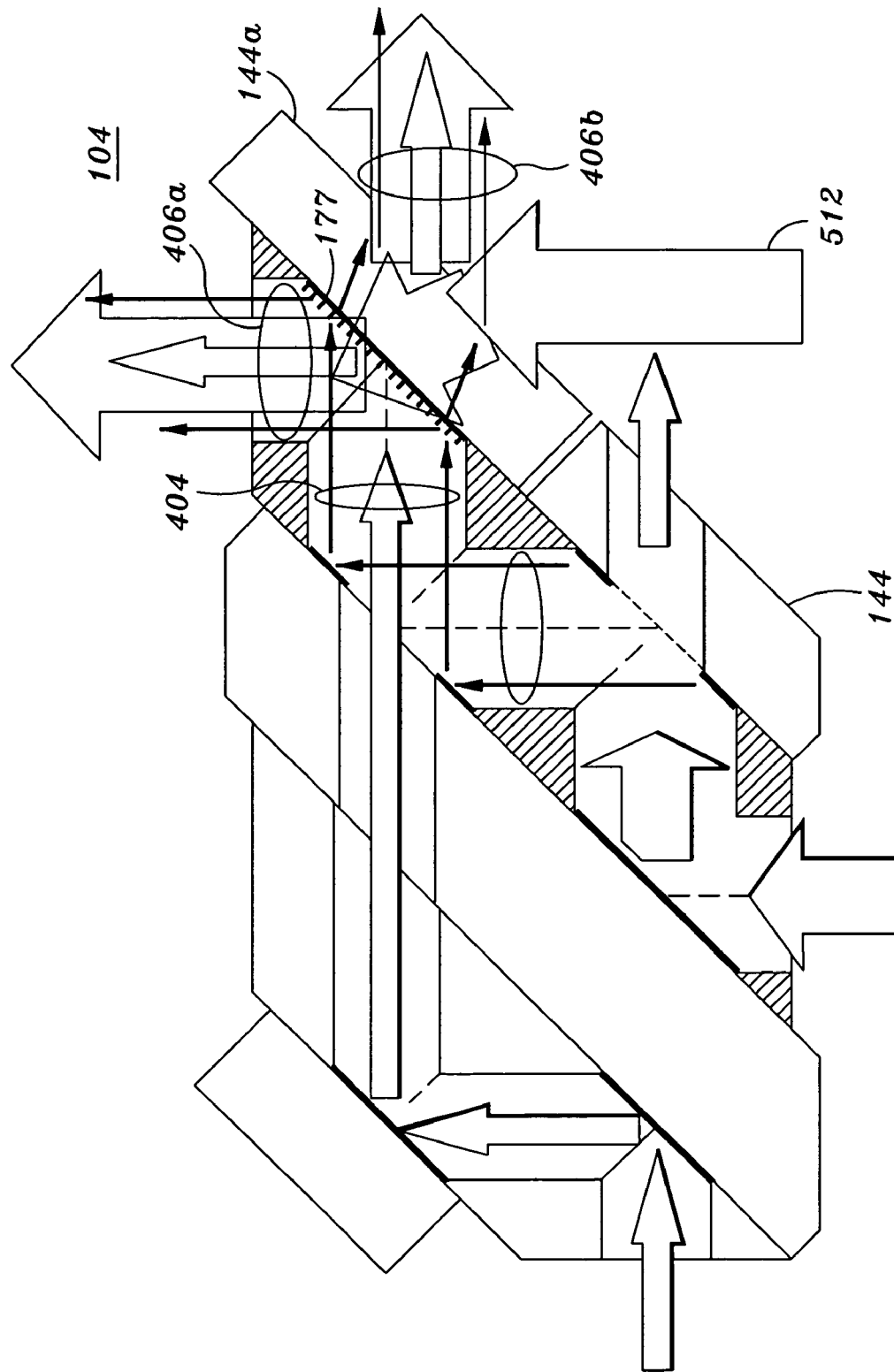

FIG. 4D shows a local oscillator (LO) beam 512 directed toward the beam combining element 144a. The beam combining element comprises the beam splitter 177. The LO beam 512 and the "reconstructed" (reassembled) beam 404 are mixed by the beam splitter 177 to produce a beam called the heterodyne signal. The beam splitter splits the heterodyne signal in two signals, 406a, 406b. In the particular configuration of the interferometer shown in FIG. 1, the heterodyne signal 406a feeds into one photodetector of the photodetector pair 106. The heterodyne signal 406b feeds into the other photodetector of the photodetector pair 106, via the fold mirror 112b. Each of the two photodetectors is a "dual" photodetector, one for the reference beam and the other for the measurement beam. Two such photodetectors are provided for redundancy, because the particular design shown in FIG. 1 was intended for a system that requires a certain level of reliable operation.

Some very desirable optical properties result from the foregoing described constraints of the "symmetric periscope" design. The parallel configuration of the reflective surfaces of each "periscope" and the parallel relation between "periscopes" ensures colinearity of the axis of propagation of the reference beam 402 with respect to the axis of propagation of the returning measurement beam 506. The equal separation distances ($D_1$, $D_2$) ensures that the reference beam 402 and the measurement beam when they are reassembled are concentric. The "periscope" configuration reduces sensitivity to angular displacement of the incident source beam with respect to the optical component.

As ambient conditions vary, the optical component 104 is subject to thermal expansion and contraction. This translates to variations in the optical paths (FIG. 2B) within the optical component 104. However, the physical relationships among the design elements remain unchanged, though there may be dimensional changes. Thus, for example, suppose an increase in temperature occurs. The spacers 202 and 204 expand (uniformly) to some degree. However, since both spacers are of the same material, both spacers will expand by the same amount. Consequently, the separations ($D_1$, $D_2$) remain substantially equal, though the separation distance is different. Similarly, the parallel relation constraints remain satisfied. For example, expansion of the double-sided mirror 142 will not affect the parallel relationship between its major surfaces 212, 214 (FIG. 2A), and thus the parallelism between the "periscopes" remains unchanged. Since the physical relationships do not change with temperature, colinearity and concentricity of the reference beam 402 and the returning measurement beam 506 in the reconstructed beam 404 remain within design margins as temperature varies. The result is an optical component for manipulating beams in an interferometer that is greatly insensitive to temperature variation.

Furthermore, as indicated above, the tolerances of the design parameters of the "symmetric periscope" will depend on the desired performance, or allowed "error budget" in the interferometer. The disclosed design parameters were contemplated for high precision interferometric measurements on the order of less than ten picometers.

Figure 6:
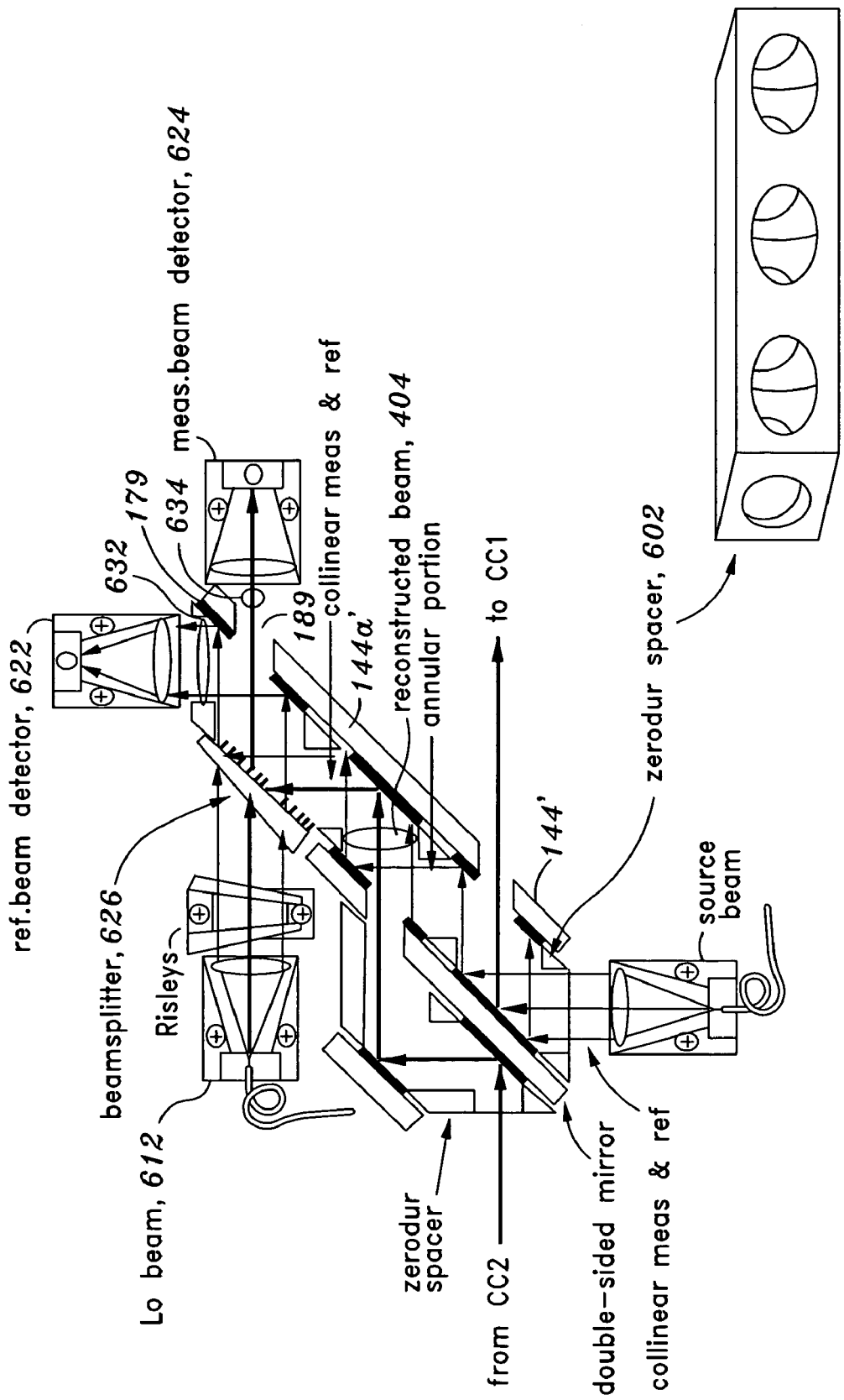
FIG. 6 shows an alternate embodiment of an interferometer, incorporating the optical component of the present invention.

FIG. 6 shows another embodiment of the present invention. Here, the foregoing described elements of the optical component that produce the reconstructed beam 404 are shown in this figure. In this particular embodiment, the mirror 144' includes an extended portion 144a' that includes an opening 189. The figure shows a solid-model view of the spacer 602 used in the embodiment of the invention.

A reference beam detector 622 and a measurement beam detector 624 are provided. The LO beam generator 612 produces a LO beam that is mixed, via the beam splitter 626, with the reconstructed beam 404 to produce the heterodyne signal. The opening 189 allows a core portion of the heterodyne signal to pass into the measurement detector 624. The core portion comprises a mixing of the returning measurement beam with the LO beam. A reflective surface 179 directs an annular portion of the heterodyne signal to the reference beam detector 622, which constitutes the reference beam mixed with the LO beam.

Figure 7:
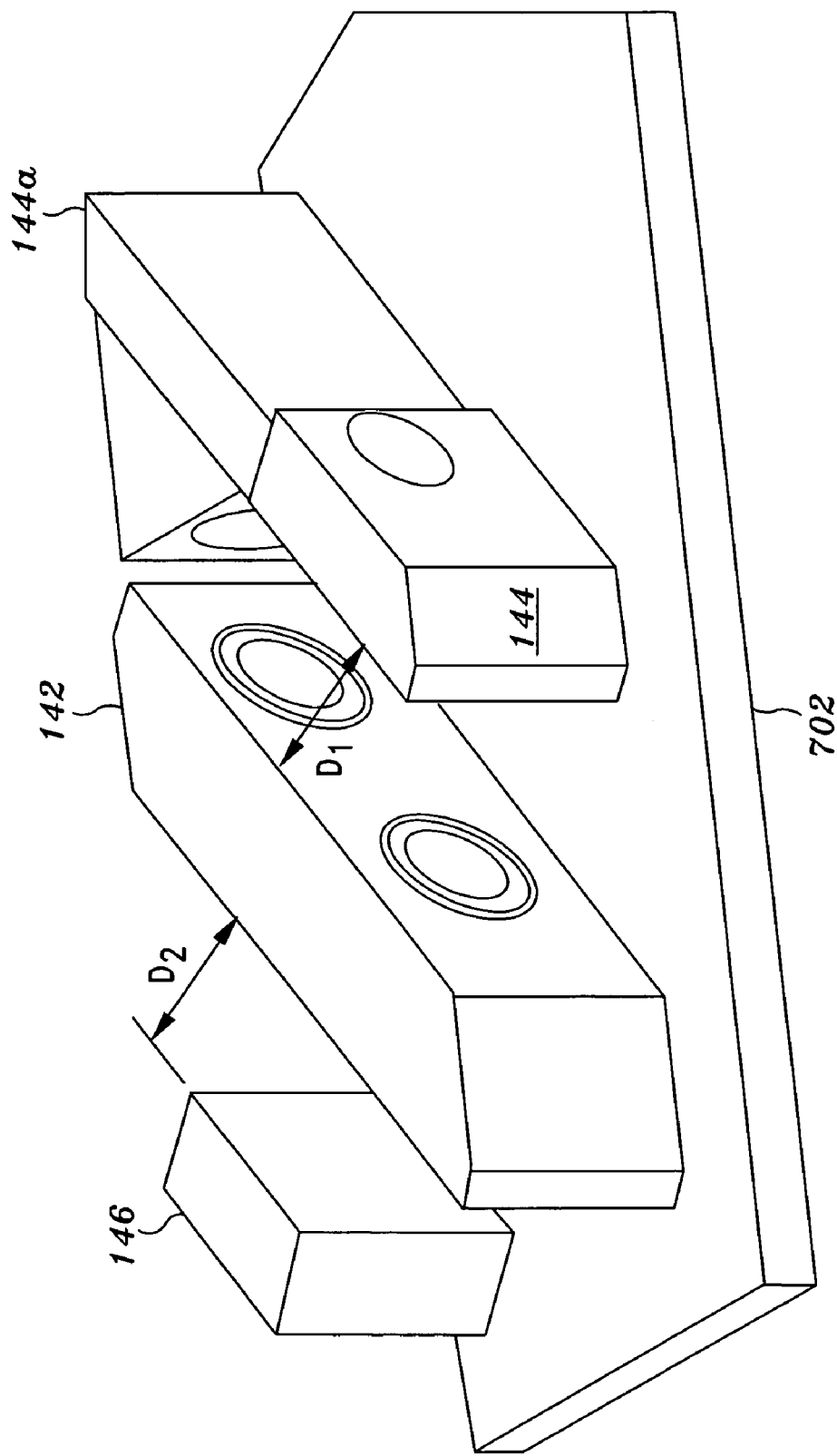
FIG. 7 shows an alternate embodiment of the optical component of the present invention.

FIG. 7 shows an alternate embodiment of the optical component 104. In this embodiment, the spacers 202, 204 are omitted. Instead, the mirror 146, the double-sided mirror 142, mirror 144 are mounted on a base plate 702. The beam combiner 144a is also provided. The mirror 144 and the mirror 146 each is aligned with respect to the double-sided mirror 142 to ensure adequate parallelism between the respective reflective surfaces. The separation distances $D_1$, $D_2$ are substantially equal. The "periscope" defined by reflective surface 178 (FIG. 2) of the mirror 146 and the reflective surface 176 (FIG. 2) of the double-sided mirror 142) is parallel to the "periscope" defined by the reflective surface 172a (FIG. 2) and the reflective surface 176 (FIG. 2) of the mirror 144 by virtue of the common substrate (142) shared by both "periscopes". When the base plate 702 expands and contracts with variations in the temperature, the change is uniform across the base plate. The elements can be permanently mounted to the base plate 702 such that each of the mirrors 142 and 144 will move away or toward the double-sided mirror 142 by the same amount, thus preserving the required spatial relationships. Therefore, the embodiment shown in FIG. 7 will be optically stable with variations in temperature.

A beneficial aspect of the invention is that the measurement beam is the unobstructed core of the source beam, which exhibits good propagation properties. An enhancement of this aspect of the invention includes the use of apodization masks. The figure shows apodization masks 162, 164. Though not necessary for the practice of the present invention, these masks can further improve the performance of the interferometer by reducing the effects of diffraction. Further detail of the use of apodization masks is discussed in a concurrently filed application entitled "APODIZATION OF BEAMS IN AN OPTICAL INTERFEROMETER" identified by Ser. No. 10/788,166 filed Feb. 25, 2004. Briefly, for the case of the apodization mask 162, it can be configured to apodize the core portion of the source beam to reduce diffraction of the core as it passes through the opening 182. This greatly enhances the propagation properties of the measurement beam.

Figure 8A:
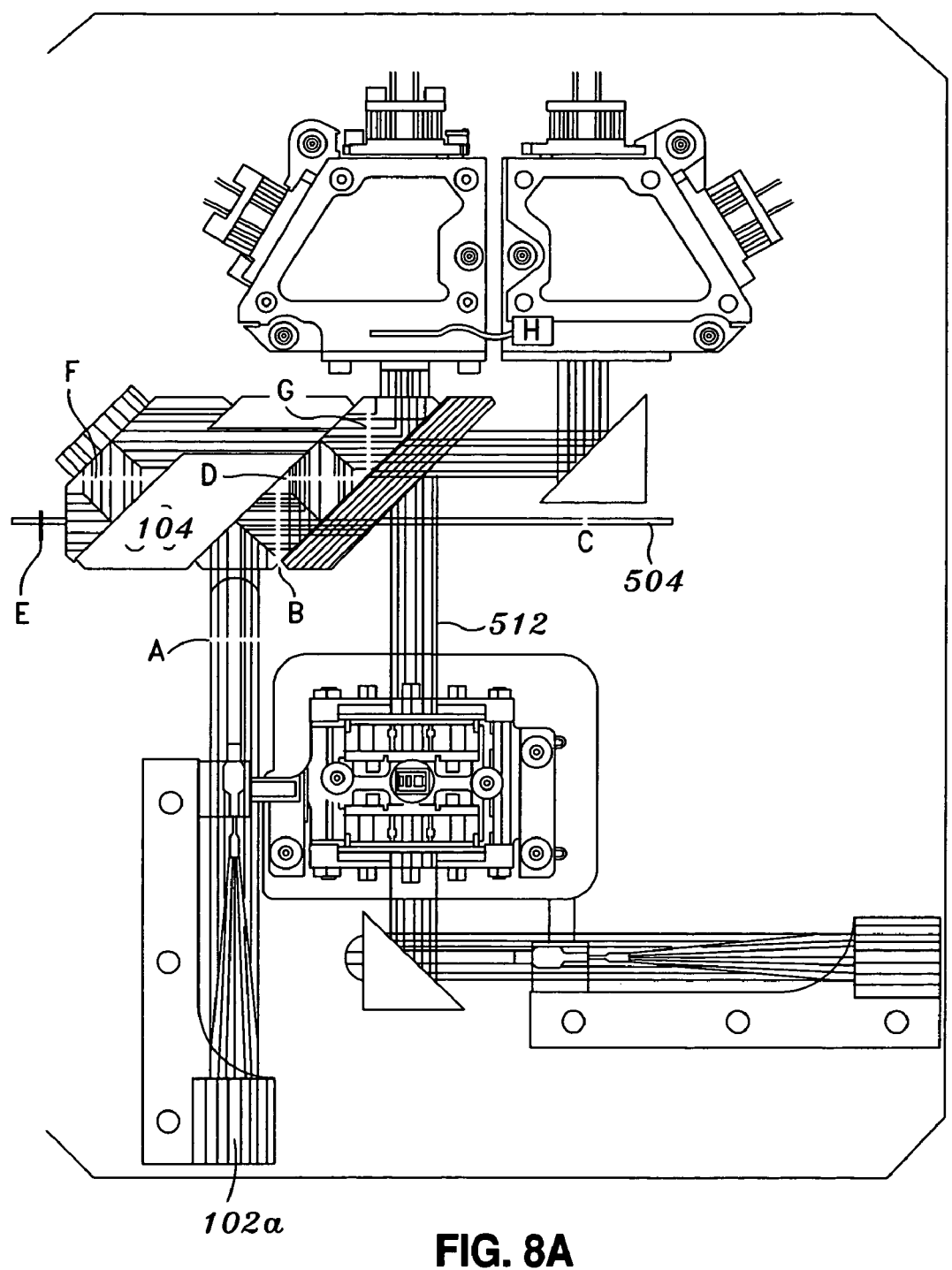
FIGS. 8A and 8B show beam intensity profiles along various points in the optical paths.
Figure 8B:
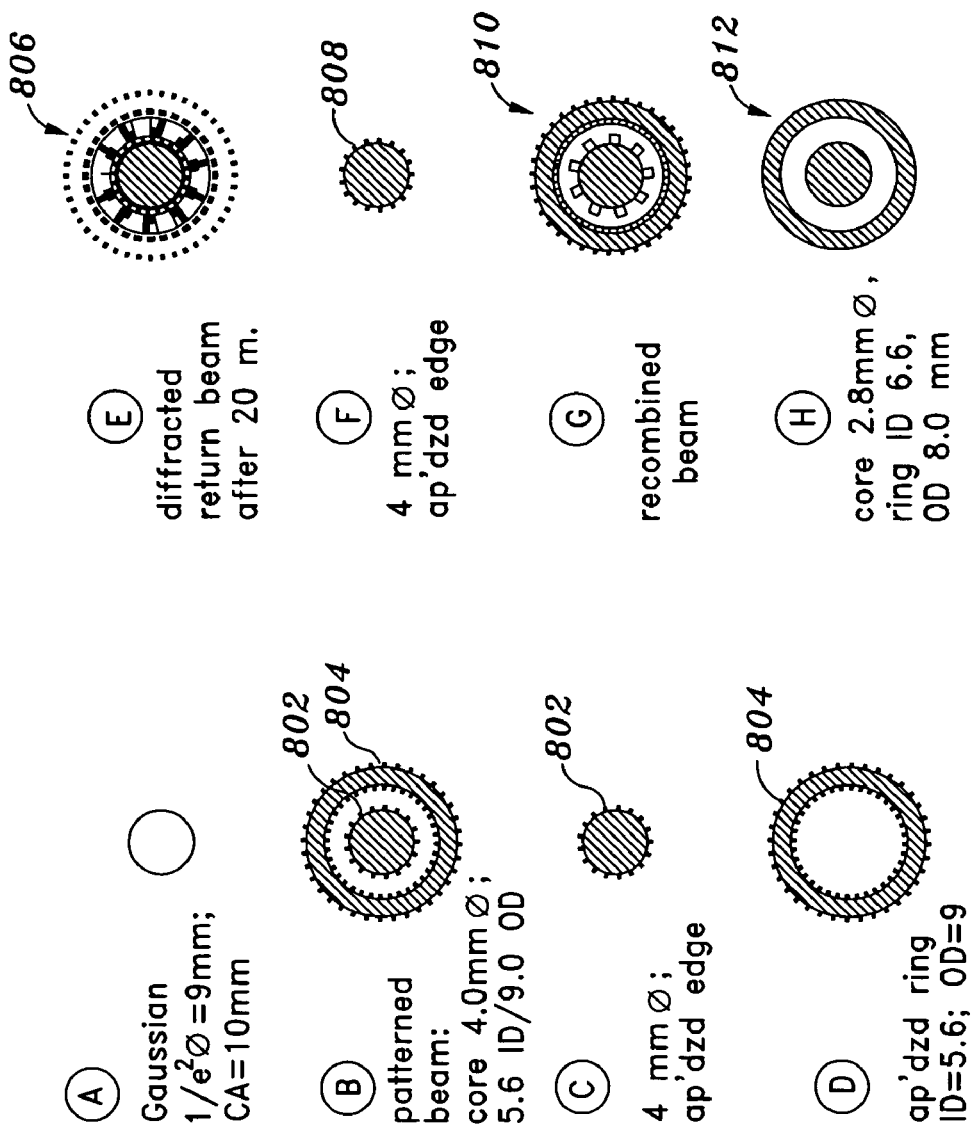

FIGS. 8A and 8B show cross-sectional views of the various beams produced in the configuration of FIG. 1. A top view solid-model rendering of the interferometer is shown in FIG. 8A. The various beams of interest are identified by reference letters "A" through "H". The cross-sectional views of the identified beams are shown in FIG. 8B. At location "A", the collimated source beam exhibits a standard Gaussian intensity cross section 802. At location "B", the collimated source beam has been reflected off the patterned mirror surface (162, 172) to become the patterned (apodized) beam seen at "B". The cross section at "B" shows a central core beam portion having an intensity cross section 802. The central core beam portion constitutes the measurement beam 504. The patterned beam at "B" also shows an annular portion having an intensity cross section 804. This annular portion constitutes the reference beam 402 (FIG. 4C). At location "C", it can be seen that the intensity cross section 802 of the measurement beam 504, when it exits the optical component 104, exhibits an apodized edge due to the beam shaping effect of the apodization mask 162 (FIG. 1). The gear-teeth graphics in FIG. 8B are notational conventions used to represent an apodized beam edges. The intensity cross section 804 of the reference beam 402 at location "D" also shows apodized edges.

The measurement beam 504 exits the optic component, interrogates the two corner cube retro-reflector (retros) to be measured, and returns at location "E" as the returning measurement beam with an intensity cross section 806. The cross section 806 represents diffraction resulting from propagation of the interrogation beam over a large distance and the reflection of the interrogation beam by the retros. However, by providing a suitable apodization mask 164 near the entrance for the measurement beam, the measurement beam can be shaped and thus cleaned up considerably to become the beam at location "F". The beam cross section 808 at location "F" represents the apodized measurement beam. At location "G", the reference beam 402 is combined with the apodized measurement beam to produce concentric beam pattern 810 at "G". The beams are combined with the LO beam 512 at the beam splitter 177 (FIGS. 1 and 4D) produce the heterodyne signal. The resulting bundle of beams is cleaned up with a mask 108 to reduce signal cross-talk, resulting in beam pattern 812 at location "H".

The disclosed embodiments show a reference beam that is annular in shape. However, it can be appreciated that other configurations are possible as well. For example, the reference beam need not be a complete annular ring. For various considerations (e.g., to avoid ghost reflections in some interferometric application or due to physical size constraints), it may be desirable to use only portions of the annular ring: the reference beam could look like a pair of crescent moons, one on either side of the measurement beam. Such beams are symmetric (both have same weighted centroid), and they preserve the spatially-separated common-path configuration.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. In an interferometer device configured for a common path heterodyne mode of operation, an optical component comprising:
   a first arrangement of reflective surfaces configured to receive a source beam and to produce therefrom a measurement beam and a reference beam, said measurement beam being directed to a target along a first propagation path, said reference beam being directed along a second propagation path; and
   a second arrangement of reflective surfaces configured to receive as a return beam said measurement beam reflected from said target and to direct said return beam along a portion of said second propagation path to reassemble said return beam and said reference beam,
   said first arrangement of reflective surfaces comprising at least a first surface in substantially parallel relation to at least a second surface and spaced apart therefrom by a distance D,
   said second arrangement of reflective surfaces comprising at least a third surface in substantially parallel relation to at least a fourth surface and spaced apart therefrom by a distance substantially equal to D,
   said first arrangement of reflective surfaces being in substantially parallel relation to said second arrangement of reflective surfaces.

2. The optical component of claim 1 wherein said second surface includes an opening therethrough, said source beam being directed towards said opening, where a portion of said source beam is transmitted through said opening as said measurement beam, where a portion of said source beam is reflected by said second surface as said reference beam, said reference beam having an annular shape.

3. The optical component of claim 2 wherein said first arrangement of reflective surfaces and said second arrangement of reflective surfaces are aligned such that said return beam is substantially concentric with said reference beam along said portion of said second propagation path.

4. The optical component of claim 1 wherein surfaces of said first arrangement of reflective surfaces are parallel to within a first predetermined margin, wherein surfaces of said second arrangement of reflective surfaces are parallel to within said first predetermined margin.

5. The optical component of claim 4 wherein said first arrangement of reflective surfaces is in substantially parallel relation to said second arrangement of reflective surfaces to within a second predetermined margin.

6. The optical component of claim 1 wherein said first arrangement of reflective surfaces further comprises an apodization mask.

7. The optical component of claim 6 wherein said first arrangement of reflective surfaces further comprises a fifth surface arranged to direct said source beam to said second surface, wherein said apodization mask is disposed on said fifth surface.

8. The optical component of claim 6 wherein said apodization mask is arranged so that said source beam is shaped by said apodization mask to produce a shaped source beam, said measurement beam and said reference beam being produced from said shaped source beam.

9. An interferometer having an optical component, said optical component comprising:
   a double-sided mirror having a first surface on which a first mirror and a second mirror are formed, and a second surface on which a third mirror is formed, said double-sided mirror having a first opening formed between said first surface and said second surface and through said second mirror;
   a fourth mirror in substantially parallel relation to said first and second mirrors and spaced apart therefrom by a distance D, said fourth mirror in alignment with respect to said first mirror to receive light reflected from said first mirror, said fourth mirror further in alignment with said second mirror to direct light reflected from said fourth mirror to said second mirror; and
   a fifth mirror in alignment with respect to said third mirror to receive light reflected from said third mirror, said fifth mirror in substantially parallel relation to said third mirror and spaced apart therefrom by a distance substantially equal to D,
   said fifth mirror in alignment with said first opening to direct light reflected from said fifth mirror through said first opening.

10. The optical component of claim 9 wherein said fourth mirror includes a second opening formed therethrough where a portion of light reflected from said first mirror passes through said second opening and another portion of light reflected from said first mirror is reflected to said second mirror.

11. The optical component of claim 9 further comprising an apodization mask disposed along an optical path defined by said first, second, and third mirrors.

12. The optical component of claim 9 further comprising an apodization mask disposed on said first mirror.

13. The optical component of claim 9 wherein said first surface and said second surface of said double-sided mirror being parallel to within a predetermined margin.

14. An optical component of an interferometer comprising:
   a first periscope comprising at least a first reflective surface and a second reflective surface, and configured to receive a source beam and to produce a reference beam and a measurement beam from said source beam, said measurement beam being directed to a target; and a second periscope comprising at least a third reflective surface and a fourth reflective surface, and configured to receive said measurement beam reflected from said target as a returning measurement beam, a spatial relationship between said first and second reflective surfaces being substantially the same as a spatial relationship between said third and fourth reflective surfaces, said first periscope in substantially parallel alignment with said second periscope, said first periscope in alignment with said second periscope to define a beam path along which both said returning measurement beam and said reference beam propagate.

15. The optical component of claim 14 further comprising a fifth reflective surface arranged to receive said source beam and to reflect said source beam to said first reflective surface, said first reflective surface having a first opening therethrough so that a core portion of said source beam passes through said first opening as said measurement beam and so that an annular portion of said source beam is reflected from said first reflective surface and toward said second reflective surface as said reference beam.

16. The optical component of claim 15 wherein said second reflective surface has a second opening therethrough, said second periscope in alignment with said second opening and configured to direct said returning measurement beam through said second opening along a first beam path, said second reflective surface arranged to receive said reference beam and to direct said reference beam along said first beam path, where said returning measurement beam and said reference beam are re-assembled.

17. The optical component of claim 14 wherein said first and third reflective surfaces are spaced apart by a distance D, and said fourth and fifth surfaces are spaced apart by a distance substantially equal to D.

18. The optical component of claim 17 wherein said first and second reflective surfaces are in parallel relation to each other and said third and fourth reflective surfaces are in parallel relation to each other.

19. The optical component of claim 14 further comprising a double-sided mirror having a first major surface and a second major surface opposite said first major surface, said second reflective surface disposed on one of said major surfaces, said third reflective surface disposed on the other of said major surfaces, said major surfaces being in parallel relation to within a predetermined margin.

20. The optical component of claim 19 further comprising a first mirror having disposed thereon said first reflective surface and a second mirror having disposed thereon said fourth reflective surface, said first mirror spaced apart from said double-sided mirror by a distance D, said second mirror spaced apart from said double-sided mirror by a distance substantially equal to D.

* * * * *